United States Patent [19]

Rickert et al.

[11] Patent Number: 4,836,992

[45] Date of Patent: Jun. 6, 1989

[54] PROCESS FOR DESULFURIZING WASTE GASES

[75] Inventors: Hans Rickert; Peter Mueller; Guenter Holzaepfel, all of Dortmund, Fed. Rep. of Germany

[73] Assignee: Vereinigte Elektrizitätswerke Westfalen AG, Dortmund, Fed. Rep. of Germany

[21] Appl. No.: 43,147

[22] Filed: Apr. 27, 1987

[30] Foreign Application Priority Data

Apr. 25, 1986 [DE] Fed. Rep. of Germany ....... 3614005

[51] Int. Cl.$^4$ .............................................. C01B 17/00
[52] U.S. Cl. .................................. 423/242; 204/59 R
[58] Field of Search ....................... 423/242 R, 242 A; 204/180 P

[56] References Cited

U.S. PATENT DOCUMENTS

| | | | |
|---|---|---|---|
| 3,475,122 | 10/1969 | McRae et al. | 423/242 |
| 3,524,801 | 8/1970 | Parsi | 423/242 |
| 4,082,835 | 4/1978 | Chlanda et al. | 423/242 |
| 4,629,545 | 2/1986 | Mani et al. | 423/242 |

*Primary Examiner*—Gregory A. Heller
*Attorney, Agent, or Firm*—Toren, McGeady & Associates

[57] ABSTRACT

A process for desulfurizing waste gas is described, wherein an SO$_2$ containing waste gas is absorbed in an aqueous solution and the resultant solution containing sulfite is treated electrolytically which is much less expensive than the prior art methods, is simpler to implement and avoids the danger of producing explosive gases which is possible in prior art methods based on anodic O$_2$ formation and cathodic H$_2$ formation. In this process, electrochemical oxidation of SO$_3^{2-}$ ions into SO$_4^{2-}$ ions occurs at the anode as well as a simultaneous formation of H$^+$ ions, thereby producing H$_2$SO$_4$, while avoiding the production of oxygen. Apparatus suitable for carrying out this process is also described.

10 Claims, 2 Drawing Sheets

PROCESS FOR DESULFURIZING WASTE GASES

FIELD OF THE INVENTION

This invention relates generally to the treatment of sulfur-containing waste gases and, more particularly, to processes for desulfurizing such gases, wherein sulfur dioxide contained in the waste gases is absorbed in an aqueous solution to form a sulfite solution which is thereafter electrolyzed. The invention also describes an electrolytic cell system for carrying out this process.

STATEMENT OF PRIOR DISCLOSURES

Sulfur dioxide, produced by the burning of fossil fuels and found in the waste gases thereof, harms animal and plant life, as well as buildings and machines, etc. For this reason, many methods for desulfurizing waste gases have been suggested. These generally allow for a reduction of about 90% of sulfur dioxide emissions. Such methods usually operate on a large scale and are based on the so-called "Calcium Process". In this process, calcium hydroxide $Ca(OH)_2$ or finely ground calcite, $CaCO_3$ is used as the absorbent. Since the gases are not readily soluble in water, they appear therein as a suspension. Utilizable gypsum is produced by this process as a by-product. The following reactions take place in this process:

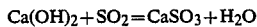

Additionally, there is another method (see, for example, H. Kau in Dechema Monographien, Volume 98, Verlag Chemie, Weinheim, 1985, p. 291 ff.) which, however has not yet found large-scale technical application. In this method, the sulfur dioxide of the waste gas is absorbed in a primary reaction vessel, the absorber, by a basic aqueous solution of NaOH and sodium hyposulfate, thereby producing sodium sulfite, $NaHSO_3$ and sodium hydrogen sulfite $NaHSO_3$. The sulfite is oxidized in a secondary reaction chamber, during which process, a sodium sulfate solution is produced. This sodium sulfate solution is, thirdly, subjected to so-called membrane electrolysis, producing the initial constituent soda lye as well as sulfuric acid.

SUMMARY OF THE INVENTION

Against the background of the prior art exemplified by West German Patent No. DE-OS No. 33 15 625, it is an object of the present invention to provide a process for desulfurizing waste gas which is simpler and much less expensive than prior art electrolytic processes and avoids the danger of producing explosive oxyhydrogen which is a possibility in the case of prior art processes owing to anodic $O_2$ production and cathodic $H_2$ production.

This object is achieved by the present invention where an electrochemical oxidation of $SO_3^{2-}$ ions occurs at the anode as well as a simultaneous formation of $H^+$ ions and the consequent formation of $H_2SO_4$ without producing oxygen.

The invention succeeds in reducing the former three- or-more step processes to a two-stage process of waste-gas desulfurization which consists essentially of $SO_2$ absorption and a new kind of oxidative electrolysis.

In this new kind of electrolysis, the following reactions take place:

At the anode, electrochemical oxidation of sulfite into sulfate occurs with the formation of $H^+$ ions, so that, totally, $H_2SO_4$ is produced, while production of oxygen at the anode is substantially prevented. The formation of sodium hydroxide and hydrogen takes place at the cathode.

There is no formation of explosive hydrogen peroxide with the present invention.

The invention avoids the disadvantages of previous processes for desulfurizing waste gas, which means, among other things, that the oxidation of sulfite to sulfate took place separately in individual steps, generally making it necessary to employ additional reactors in most cases. All such disadvantages are avoided by combining the oxidation step with the electrolysis of the sulfate to form sulfuric acid and a recyclable base.

In another embodiment of the invention where the absorbing solution also contains chloride ions and other anions form which volatile gases are formed through oxidation depending on the kind of fuel used and on the makeup of the waste gases treated, there is provided a process whereby the chloride ions contained in the absorbing solution as well as the other anions are conveyed to the anode where they are oxidized into chlorine gas and into the gases corresponding to the other anions and then removed. In this manner, unwanted salting of the absorbing solution, such as by sodium chloride, can be avoided and by-product chlorine gas can be extracted and used for other commercial purposes.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DETAILED DESCRIPTION OF THE PREFERRED EMBODIMENT

In the initial step of the process, $SO_2$ is absorbed in an alkaline solution, such as an aqueous solution of NaOH, $Na_2CO_3$, or $Na_2SO_4$ to form an alkaline solution containing sulfite ions. The aqueous solution containing sulfite ions is introduced into the anode compartment of an electrolytic cell which contains at least one anode and at least one cathode compartment separated by an ion exchange membrane and in the second step of the process, electrochemical oxidation of the sulfite ions to sulfate ions is carried out in the anode compartment of the cell with the simultaneous producton of hydrogen ions, but substantially without production of oxygen.

Figure 1:
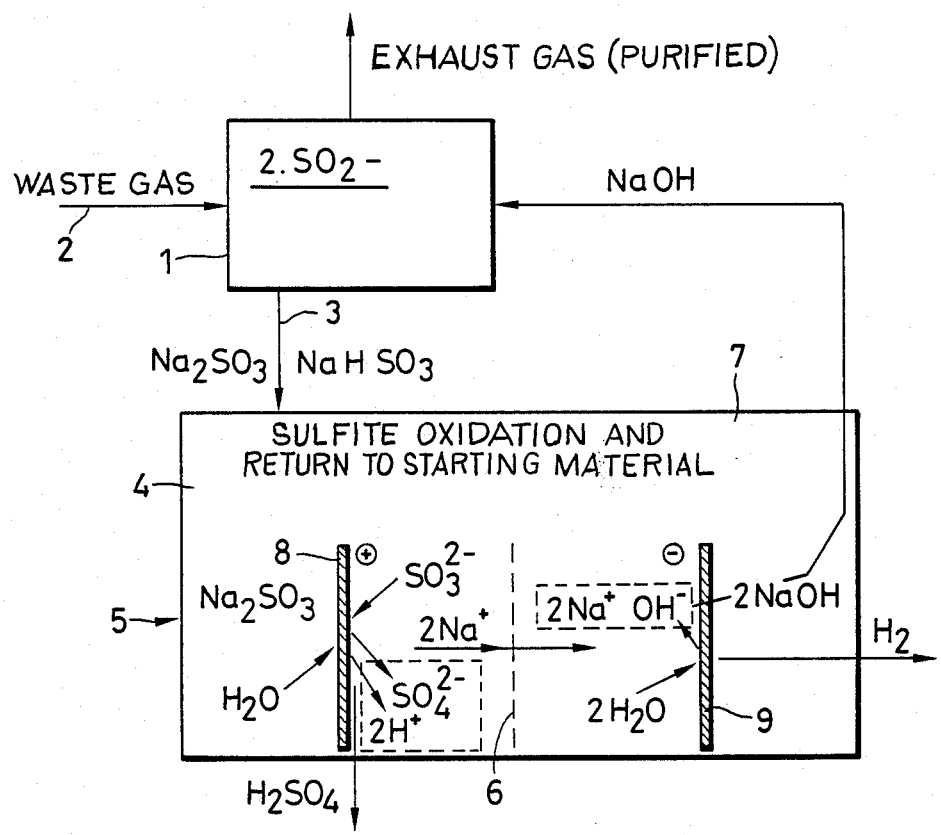
FIG. 1 is a schematic illustration of the process of the invention.

Referring descriptively to FIG. 1, the sulfite solution 3 derived from the absorption 1 of the $SO_2$ from the waste gas 2 in a NaOH solution is broken down into sodium ($Na^+$) and sulfite ($SO_3^{2-}$) ions and is conveyed into the anode compartment 4 of an electrochemical cell 5 equipped with a cation exchange membrane 6, while the cathode compartment contains water whose conductivity is increased by the addition of, for example, NaOH solution. When electric current is sent through this material, the following reaction occurs at anode 8:

$$SO_3^{2-} + H_2O = SO_4^{2-} + 2H^+ + 2e^-.$$

That is, the sulfite ions $SO_3^{2-}$ of the sodium sulfite solution are converted to sulfate ions $SO_4^{2-}$ by oxidation and, additionally, $H^+$ ions are produced, and these, with the $SO_4^{2-}$ ions, produce sulfuric acid. Upon the application to cation exchange membrane 6, current is carried in the cell 5 of anode 8 to cathode 9 mainly via the $NA^+$ ions which pass through the membrane from anode compartment 4 into the cathode compartment 7.

At cathode 9, the following reaction occurs:

$$2H_2O + 2e^- = H_2 + 2OH^-.$$

That is, hydrogen forms at cathode 9 and $OH^-$ ions are produced; these combine with $Na^+$ ions conveyed from anode compartment 4 to produce sodium hydroxide solution which can be used again in the present process for waste gas desulfurization.

By employing this process, it is therefore possible to integrate the previously separate process of oxidation with a process of regeneratio, thereby simplifying the process of desulfurizing waste gas; and, in so doing, the final products, reusable NaOH and sulfuric acid, are produced.

Figure 2:
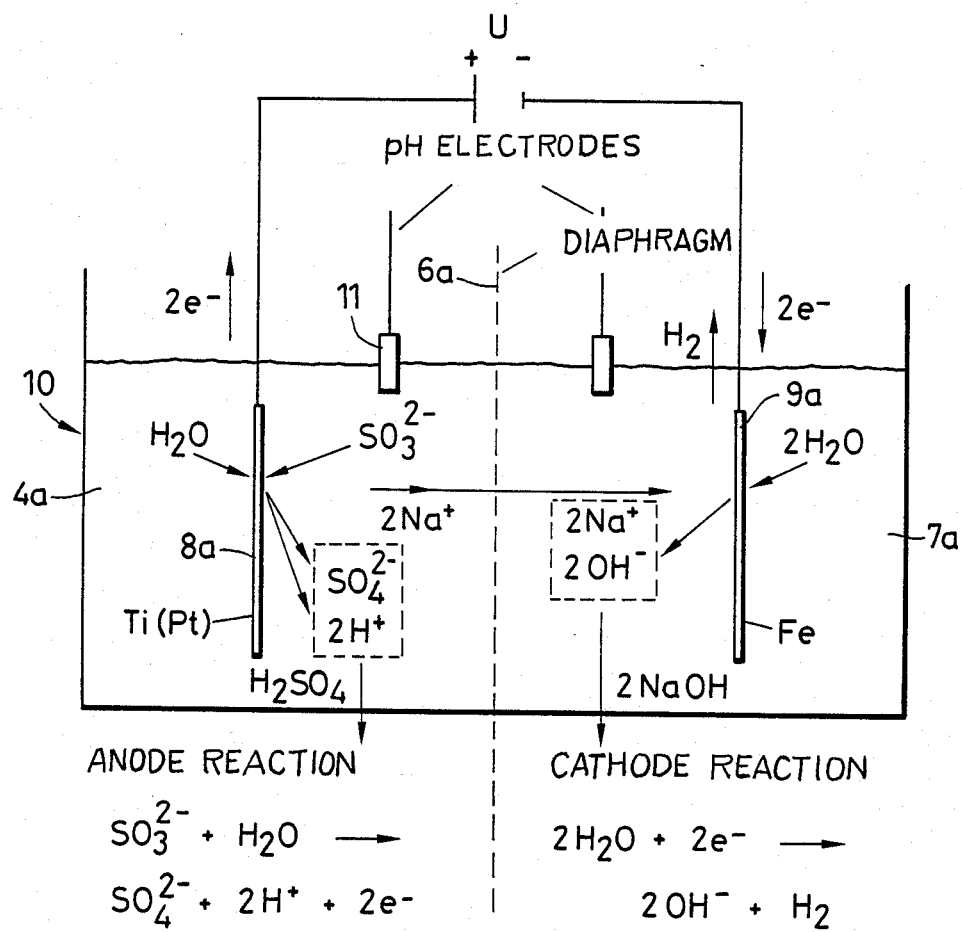
FIG. 2 is a schematic representation of a cell for the electrochemical oxidation of a sulfite with resulting formation of NaOH and $H_2SO_4$.

Referring now to FIG. 2, the same shows a test assembly for evaluating the present invention. In an electrolysis chamber 10 which has been divided into two compartments 4a and 7a by means of a diaphragm 6a made of a cation exchange membrane are mounted an anode 8a made of platinized titanium Ti(Pt) and a cathode 9a made of stainless steel Fe. The anode compartment contained 0.1 molar sodium sulfite solution, while the cathode 7a contained water whose conductivity had been increased by the addition of NaOH. In addition, a glass electrode 11 had been introduced into both the anode and cathode compartments in order to measure the pH levels.

Under a voltage of 4 volts, approximately 40 mA of current was present in this cell 10. As soon as current was applied, hydrogen gas was formed at the cathode 9a. However, and unexpectedly, no gas formation was at first visible at anode 8a. This observation indicated that an electrochemical reaction occurred at anode 8a leading to the oxidation of the sulfite with the consequent formation of sulfuric acid. Such provided to be the case, in fact, when a chemical analysis of the solution in the anode compartment 4a was made by electrolysis.

The solution now contained sulfate ions, while there were only traces of sulfite ions. The change in the pH level in the solution from 8 at the beginning to approximately 2 in the anode compartment 4a after electrolysis confirmed the formation of acid. The formation of base was evidenced by the increase in the pH level in the cathode compartment 9a during electrolysis.

While a specific embodiment of the invention has been shown and described in detail to illustrate the application of the inventive principles, it will be understood that the invention may be embodied otherwise without departing from such principles.

What is claimed is:

1. In a process for desulfurizing waste gas containing $SO_2$, in which $SO_2$ is absorbed in an aqueous alkaline solution and the resulting solution containing $SO_3^{2-}$ ions is subjected to electrolysis in an electrolytic cell containing an anode and a cathode to produce $O_2$ at the anode and $H_2$ at the cathode, the improvement comprising introducing the solution containing sulfite ions to the anode compartment of an electrolytic cell having at least one anode compartment and at least one cathode compartment separated by an ion exchange membrane and passing an electric current through the electrolytic cell to effect electrochemical oxidation of $SO_3^{2-}$ ions to $SO_4^{2-}$ ions with the simultaneous formation of $H^+$ ions in the anode compartment, the formation of hydrogen and $OH^-$ ions in the cathode compartment, and substantially without formation of oxygen.

2. Process according to claim 1, wherein the absorption of $SO_2$ occurs in an aqueous NaOH, $Na_2CO_3$, or $Na_2SO_4$ solution.

3. The process according to claim 2 wherein the electric current is carried from the anode compartment to the cathode compartment mainly by $Na^+$ ions which pass through the ion exchange membrane from the anode to the cathode compartment, whereby sodium hydroxide is formed in the anode compartment and sulfuric acid in the cathode compartment.

4. The process of claim 1, wherein said gases also contain chloride ions.

5. The process according to claim 1 wherein the aqueous alkaline solution containing sulfite ions also contains chloride ions and the chloride ions are oxidized to chlorine gas in the anode compartment during the electrochemical oxidation.

6. A process for desulfurizing waste gas containing $SO_2$, comprising contacting the waste gas with an alkaline solution to form an alkaline solution containing $SO_3^{2-}$ ions, introducing the alkaline solution containing $SO_3^{2-}$ ions to the anode compartment of an electrolytic cell having at least one anode compartment and at least one cathode compartment separated by an ion exchange membrane, passing an electric current through the electrolytic cell to effect electrochemical oxidation of the $SO_3^{2-}$ ions to $SO_4^{2-}$ ions with the simultaneous formation of $H^+$ ions in the anode compartment and the formation of hydrogen and $OH^-$ ions in the cathode compartment, substantially without the production of oxygen.

7. The process of claim 6, further comprising adding base to said sulfidic solution to increase the conductivity thereof.

8. The process according to claim 6 wherein the electric current is carried from the anode compartment to the cathode compartment mainly by $Na^+$ ions which pass through the ion exchange membrane from the anode to the cathode compartment, whereby sodium hydroxide is formed in the cathode compartment and sulfuric acid in the anode compartment.

9. The process according to claim 6 wherein the aqueous alkaline solution containing sulfite ions also contains chloride ions and the chloride ions are oxidized to chlorine gas in the anode compartment during the electrochemical oxidation.

10. The process according to claim 6 wherein the waste gas is contacted with an aqueous solution of NaOH, $Na_2CO_3$, or $Na_2SO_4$.

* * * * *